(12) United States Patent
Vora

(10) Patent No.: US 12,214,807 B2
(45) Date of Patent: Feb. 4, 2025

(54) ARRANGING TRIPS FOR AUTONOMOUS VEHICLES BASED ON WEATHER CONDITIONS

(71) Applicant: Waymo LLC, Mountain View, CA (US)

(72) Inventor: Mishika Vora, Hayward, CA (US)

(73) Assignee: WAYMO LLC, Mountain View, CA (US)

( * ) Notice: Subject to any disclaimer, the term of this patent is extended or adjusted under 35 U.S.C. 154(b) by 517 days.

(21) Appl. No.: 17/324,334

(22) Filed: May 19, 2021

(65) Prior Publication Data

US 2022/0371618 A1  Nov. 24, 2022

(51) Int. Cl.
| | |
|---|---|
| *B60W 60/00* | (2020.01) |
| *B60H 1/00* | (2006.01) |
| *B60W 10/30* | (2006.01) |
| *G01C 21/34* | (2006.01) |
| *G01C 21/36* | (2006.01) |
| *G08G 1/00* | (2006.01) |

(52) U.S. Cl.
CPC ... *B60W 60/00253* (2020.02); *B60H 1/00357* (2013.01); *B60W 10/30* (2013.01); *G01C 21/3438* (2013.01); *G01C 21/3492* (2013.01); *G01C 21/3661* (2013.01); *G01C 21/3691* (2013.01); *G08G 1/202* (2013.01); *B60W 2530/00* (2013.01); *B60W 2555/20* (2020.02)

(58) Field of Classification Search
CPC ... B60H 1/00357–00807; G06Q 10/04; G06Q 50/40–47; G05D 1/0088; G05D 1/00; G08G 1/006; G08G 1/00; B60W 60/00; G01C 21/00

USPC ..................................................... 701/23–28
See application file for complete search history.

(56) References Cited

U.S. PATENT DOCUMENTS

| | | | | |
|---|---|---|---|---|
| 11,656,093 | B2 * | 5/2023 | Pan ..................... | G01C 21/3679 701/24 |
| 2003/0083805 | A1 * | 5/2003 | Stefan ................ | G01C 21/3626 340/988 |

(Continued)

FOREIGN PATENT DOCUMENTS

| | | | | |
|---|---|---|---|---|
| EP | 2527213 A1 * | 11/2012 | ....... | B60R 21/01516 |
| EP | 2942216 B1 * | 11/2019 | ............... | B60H 1/00 |

(Continued)

*Primary Examiner* — Rami Khatib
*Assistant Examiner* — Paul Allen
(74) *Attorney, Agent, or Firm* — Botos Churchill IP Law

(57) ABSTRACT

Aspects of the disclosure provide for arranging trips for autonomous vehicles. For instance, a request for a trip may be received by one or more processors of one or more server computing devices. The request may identify an initial location. A weather condition at the initial location may be identified. One or more internal vehicle state conditions and one or more priorities for pulling over may be determined based on the weather condition. A second location may be determined based on the one or more priorities and the initial location. Dispatch instructions may be provided to an autonomous vehicle, the dispatch instructions identifying the second location and the one or more internal vehicle state conditions in order to cause computing devices of the autonomous vehicle to control the autonomous vehicle to the second location and adjust internal vehicle state conditions based on the one or more internal vehicle state conditions.

20 Claims, 12 Drawing Sheets

(56) References Cited

U.S. PATENT DOCUMENTS

| | | | | |
|---|---|---|---|---|
| 2012/0277952 | A1* | 11/2012 | MacNeille | G01C 21/3453 |
| | | | | 701/36 |
| 2014/0195214 | A1* | 7/2014 | Kozloski | G08G 1/0129 |
| | | | | 703/8 |
| 2017/0344010 | A1* | 11/2017 | Rander | G06Q 10/08 |
| 2018/0040183 | A1* | 2/2018 | Cheng | G07C 9/00309 |
| 2018/0091604 | A1* | 3/2018 | Yamashita | G06Q 20/28 |
| 2018/0203443 | A1* | 7/2018 | Newman | B60L 1/00 |
| 2018/0328748 | A1* | 11/2018 | Chachra | G06F 16/9537 |
| 2018/0348740 | A1* | 12/2018 | Rocci | G16B 99/00 |
| 2019/0180621 | A1* | 6/2019 | Matsuda | B60R 21/00 |
| 2019/0197430 | A1* | 6/2019 | Arditi | G06N 20/00 |
| 2019/0286143 | A1 | 9/2019 | Ross et al. | |
| 2020/0143322 | A1* | 5/2020 | Dearing | G06K 7/10861 |
| 2020/0276987 | A1* | 9/2020 | Yamane | G06V 20/586 |
| 2020/0307352 | A1* | 10/2020 | Boston | B60H 1/00357 |
| 2021/0068312 | A1* | 3/2021 | Tobiassen | H01M 10/613 |
| 2022/0049973 | A1* | 2/2022 | Quint | G01C 21/362 |
| 2022/0221867 | A1* | 7/2022 | Taveira | B60W 60/0016 |
| 2022/0252409 | A1* | 8/2022 | Harrington | G01C 21/343 |
| 2022/0316888 | A1* | 10/2022 | Chernov | G01C 21/3807 |
| 2022/0349721 | A1* | 11/2022 | Hukkeri | G01C 21/3453 |

FOREIGN PATENT DOCUMENTS

| | | | | |
|---|---|---|---|---|
| WO | WO-2013113751 | A2 * | 8/2013 | B60L 11/1809 |
| WO | 2017172415 | A1 | 10/2017 | |
| WO | 2018208789 | A1 | 11/2018 | |
| WO | WO-2019027735 | A1 * | 2/2019 | B64C 39/024 |
| WO | WO-2023049187 | A1 * | 3/2023 | B60W 60/00253 |

* cited by examiner

| Weather Condition | WC1 | WC2 | WC3 |
|---|---|---|---|
| Vehicle State Condition & One or More Priorities | VSC1, P1 | VSC2, P2 | VSC3, P3 |

FIGURE 8

ARRANGING TRIPS FOR AUTONOMOUS VEHICLES BASED ON WEATHER CONDITIONS

BACKGROUND

Autonomous vehicles, for instance, vehicles that may not require a human driver, can be used to aid in the transport of passengers or items from one location to another. Such vehicles may operate in a fully autonomous mode where passengers may provide some initial input, such as a pickup or destination location, and the vehicle maneuvers itself to that location. When approaching the location or at any point during a trip, an autonomous vehicle may continuously look for locations to stop the vehicle. These locations may be used, for example, for brief stops to pick up and/or drop off passengers and/or goods for example, for a transportation service. Typically, autonomous vehicles may look for such locations when the vehicle is within some distance of a destination.

BRIEF SUMMARY

Aspects of the disclosure provide a method of arranging trips for autonomous vehicles. The method includes receiving, by one or more processors of one or more server computing devices, a request for a trip for a user, the request identifying an initial location; identifying, by the one or more processors, a weather condition at the initial location; identify, by the one or more processors, one or more internal vehicle state conditions and one or more priorities for pulling over based on the weather condition; determining, by the one or more processors, a second location based on the one or more priorities and the initial location; and providing, by the one or more processors, dispatch instructions to an autonomous vehicle, the dispatch instructions identifying the second location and the one or more internal vehicle state conditions in order to cause computing devices of the autonomous vehicle to (1) control the autonomous vehicle to the second location in an autonomous mode and (2) to adjust internal vehicle state conditions of the autonomous vehicle based on the one or more internal vehicle state conditions.

In one example, identifying the one or more internal vehicle state conditions and the one or more priorities includes looking up the weather condition in memory. In another example, the one or more internal vehicle state conditions includes open windows, and adjusting the internal vehicle state conditions includes opening one or more windows of the autonomous vehicle. In another example, the one or more internal vehicle state conditions includes closed windows, and adjusting the internal vehicle state conditions includes closing any open windows of the autonomous vehicle. In another example, the one or more internal vehicle state conditions includes maximum air conditioning, and adjusting the internal vehicle state conditions turning on a maximum air conditioning setting for the autonomous vehicle. In another example, the one or more internal vehicle state conditions includes maximum heat, and adjusting the vehicle state conditions turning on a maximum heat setting for the autonomous vehicle. In another example, the one or more internal vehicle state conditions includes a certain temperature, and adjusting the vehicle state conditions adjusting heating or air conditioning for the autonomous vehicle. In another example, the one or more priorities includes prioritizing being closer to the user. In another example, the one or more priorities includes being stopping in a location where a vehicle is able to wait for a particular period of time. In another example, the one or more priorities includes relaxing constraints related to inconveniencing other road users. In another example, the one or more priorities includes avoiding congested areas. In another example, determining the second location includes using the one or more priorities to adjust one or more weights for a plurality of factors selecting locations. In another example, the initial location is the second location. In another example, the initial location is different from the second location. In another example, the method also includes, providing the second location to a client computing device for display to a user as a suggested location. In this example, the method also includes in response to providing the second location to the client computing device, receiving a confirmation signal from the client computing device, and the dispatch instructions are provided in response to receiving the confirmation signal.

In another example, the initial location is a pickup location for the user and the request further identifies a drop off location for the user, and the method further includes: identifying, by the one or more processors, a weather condition at the drop off location; determining, by the one or more processors, one or more priorities for pulling over based on the weather condition at the drop off location; and determining, by the one or more processors, a third location based on the one or more priorities and the drop off location, and wherein providing the dispatch instructions includes providing the third location to the autonomous vehicle. In another example, the method also includes, after providing the dispatch instructions, identifying an updated weather condition at the drop off location; determining a fourth location based on the updated weather condition; and sending updated dispatch instructions to the autonomous vehicle identifying the fourth location. In another example, the method also includes, after providing the dispatch instructions, identifying an updated weather condition at the initial location; determining a third location based on the updated weather condition; and sending updated dispatch instructions to the autonomous vehicle identifying the third location. In another example, the method also includes receiving information identifying how internal vehicle state conditions were adjusted by users after entering the autonomous vehicles; and adjusting the one or more internal vehicle state conditions based on the received information.

BRIEF DESCRIPTION OF THE DRAWINGS

FIG. 8 is an example of a relationship table in accordance with aspects of the disclosure.

DETAILED DESCRIPTION

Overview

Figure 1:
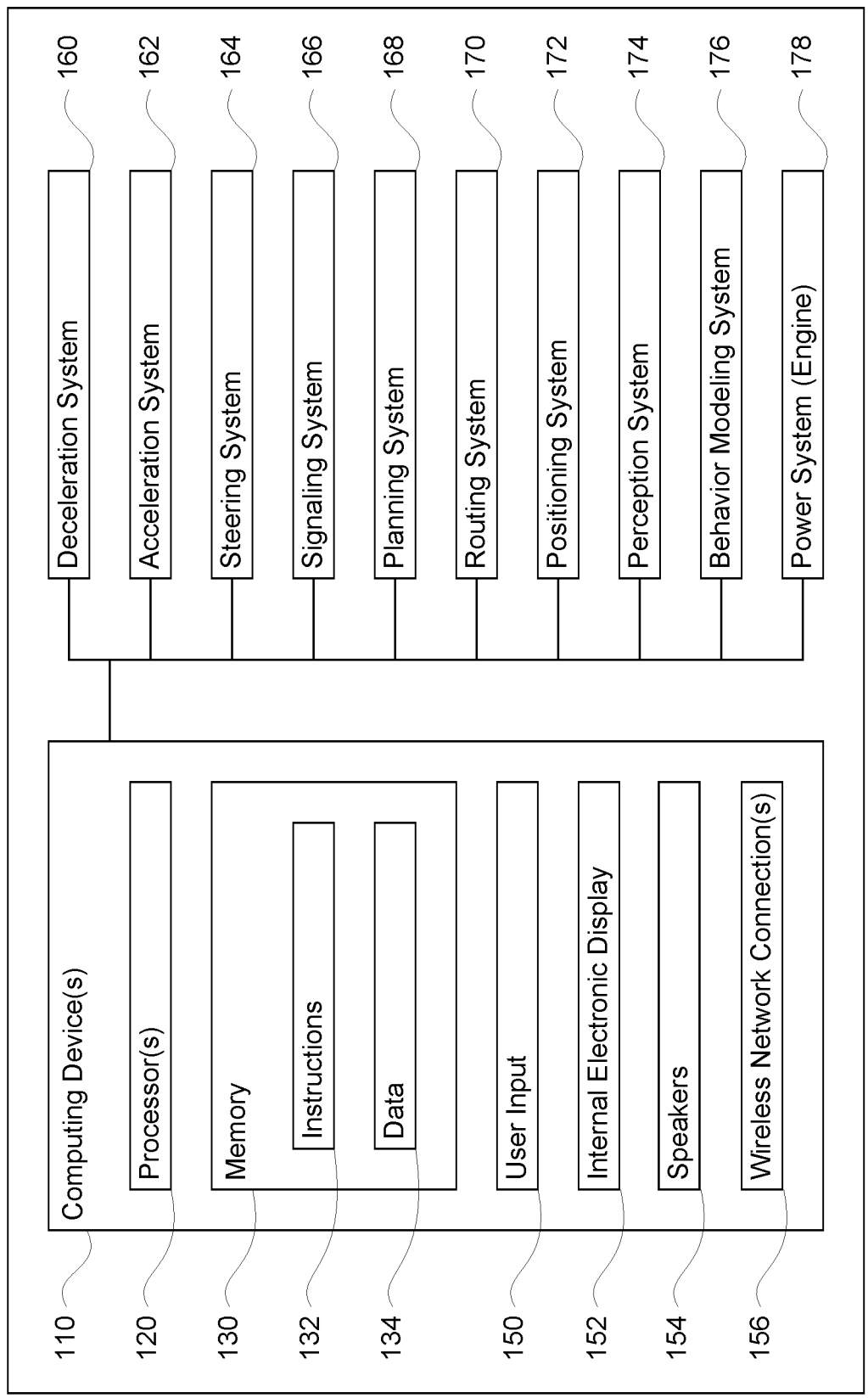
FIG. 1 is a functional diagram of an example vehicle in accordance with an exemplary embodiment.

The technology relates to selecting pick up and drop off locations for transportation services that utilize autonomous vehicles. Such services can use weather information to improve user experience during pick up, drop off, and during rides. For instance, pickups and drop offs can all be optimized by remote computing devices such as one or more dispatching server computing devices in order to reduce the impacts of weather conditions on passengers, thereby improving the overall rider experience.

A user of the transportation service may download an application for requesting a vehicle to a client computing device. For instance, the user may input a pickup location (or this may be automatically determined using a location of the client computing device) as well as a destination (e.g. a drop off location) location for a trip into the client computing device, and the application may send a signal identifying a pickup and/or a drop off location, referred to hereafter as an "initial" location, to the one or more server computing devices.

In response to receiving a location for a trip, the one or more server computing devices may determine a weather condition at the initial location. In order to do so, the server computing device may be able to access information about current or predicted weather conditions. In some examples, current weather conditions can be determined using onboard vehicle sensors and sharing this information with other vehicles and/or the server computing device. In addition or alternatively, current and predicted weather conditions may be retrieved from third party weather sources which can provide information such as rates of precipitation, temperatures, etc.

Based on the determined weather condition, the server computing devices may identify one or more internal vehicle state conditions as well as one or more priorities for pulling over for the initial location. In this regard, the weather conditions, priorities, and internal vehicle state conditions may be associated with one another pre-stored in a table (e.g. a relationship table), database or other storage configuration such that with the determined weather condition, the server computing devices are able to access and identify an associated one or more priorities for stopping at the location as well as one or more internal vehicle state conditions. The one or more priorities may be used to assist the server computing devices in selecting a location (e.g. for pickup or drop off) for the trip.

Using the one or more priorities, the server computing devices may select an actual location for the trip using a cost-based analysis. For example, given an initial location, the server computing devices may attempt to identify a location within a predetermined distance of the initial location by weighing a plurality of factors in order to determine a cost for nearby locations. The one or more priorities may thus be used to adjust, up or down, the weights for the different factors.

The location with the lowest cost may then be identified and provided to the client computing device as an actual or suggested location for the trip. In other words, the server computing devices may set the location automatically (actual location) or may provide the location as a suggestion and allow some further adjustments by the user. In some cases, the initial location and the actual or suggested location may be the same location, and in other cases, the initial location and the actual or suggested location may be different.

The identified location may be sent to the user's client computing device to be displayed to the user. Once the user is satisfied with the identified (or adjusted) locations for each of the pickup and drop off locations, he or she may confirm the trip. This may send a confirmation signal to the server computing devices.

In response, the server computing devices may select a vehicle and send dispatch instructions to that vehicle. The vehicle may be selected based on proximity to the pickup location for the trip, availability of vehicles, and other factors. The dispatch instructions may identify a pickup location, a destination location for the trip, and the one or more internal vehicle state conditions. Initially, once the vehicle is ready to pick up the user, the vehicle's computing devices may set the pickup location as a destination for the trip in order to control the vehicle to that destination in the autonomous driving mode. At the same time or at some point before reaching the pickup location the vehicle's computing devices may adjust the vehicle's internal state based upon the internal vehicle state condition. Once stopped, the vehicle's computing devices may set the drop off location as a destination for the vehicle in order to control the vehicle to that destination in the autonomous driving mode.

The features described herein may provide an improved user experience for transportation services provided by autonomous vehicles. For instance, by leveraging certain weather information, this can be used to choose better pickup or drop off locations and also provide a user with an expectation of what is going to happen during a trip. Similarly, doing so at the server computing devices when the user is setting up the trip may also provide a user with an expectation of what is going to happen during a trip. In addition, by updating an internal state of the vehicle, the user may actually feel more comfortable and relaxed during a trip.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., one or more button, mouse, keyboard, touch screen and/or microphone), various electronic displays (e.g., a monitor having a screen or any other electrical device that is operable to display information), and speakers 154 to provide information to a passenger of the vehicle 100 or others as needed. For example, electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The computing devices 110 may be part of an autonomous control system for the vehicle 100 and may be capable of communicating with various components of the vehicle in order to control the vehicle in an autonomous driving mode. For example, returning to FIG. 1, the computing devices 110 may be in communication with various systems of vehicle 100, such as deceleration system 160, acceleration system 162, steering system 164, signaling system 166, planning system 168, routing system 170, positioning system 172, perception system 174, behavior modeling system 176, and power system 178 in order to control the movement, speed, etc. of vehicle 100 in accordance with the instructions 134 of memory 130 in the autonomous driving mode.

As an example, the computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. The computing devices 110 may also use the signaling system 166 in order to signal the vehicle's intent to other drivers or vehicles, for example, by lighting turn signals or brake lights when needed.

Routing system 170 may be used by the computing devices 110 in order to generate a route to a destination using map information. Planning system 168 may be used by computing device 110 in order to generate short-term trajectories that allow the vehicle to follow routes generated by the routing system. In this regard, the planning system 168 and/or routing system 166 may store detailed map information, e.g., pre-stored, highly detailed maps identifying a road network including the shape and elevation of roadways, lane lines, intersections, crosswalks, speed limits, traffic signals, buildings, signs, real time traffic information (updated as received from a remote computing device, as such as the computing devices 410 discussed below or other computing devices), pullover spots, vegetation, or other such objects and information.

Figure 2A:
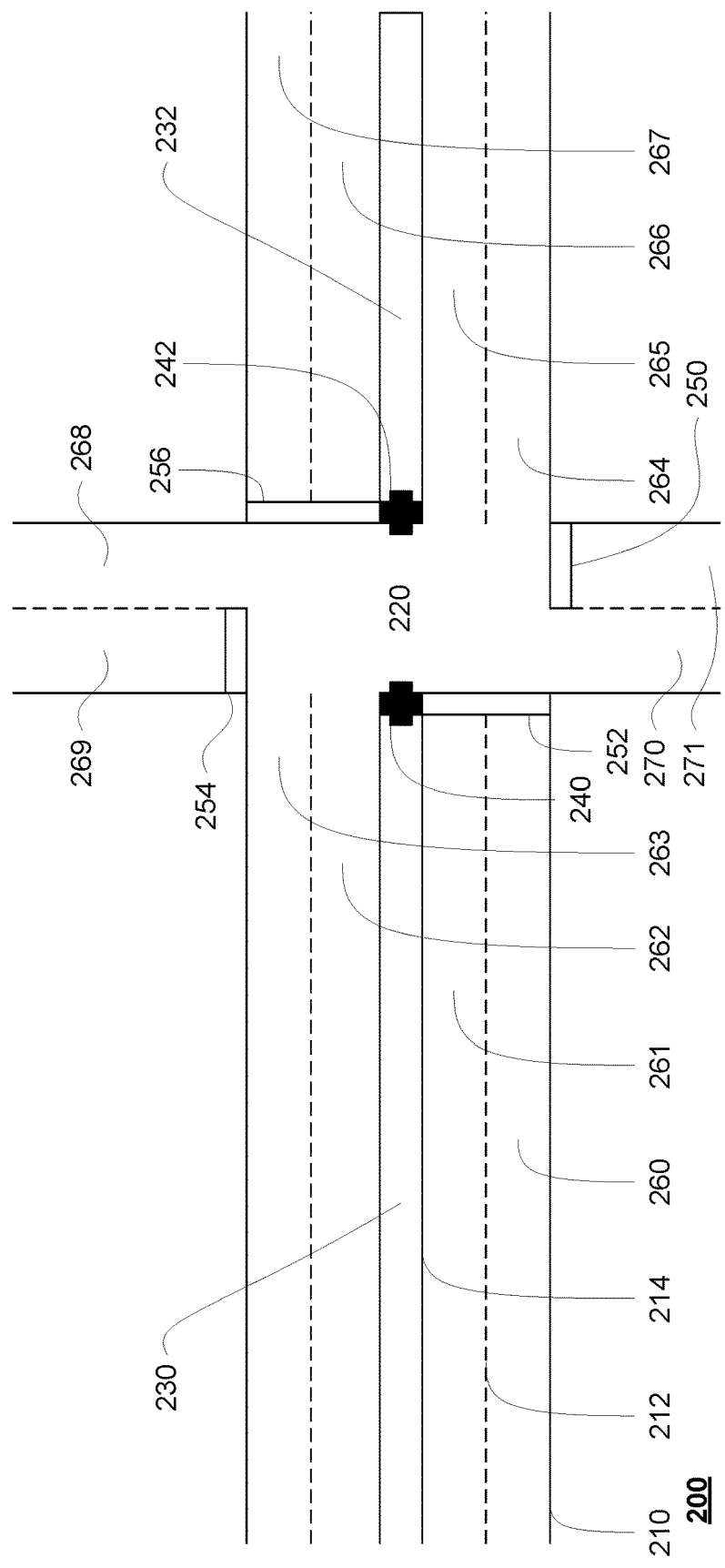
FIGS. 2A and 2B are an example of map information in accordance with aspects of the disclosure.
Figure 2B:
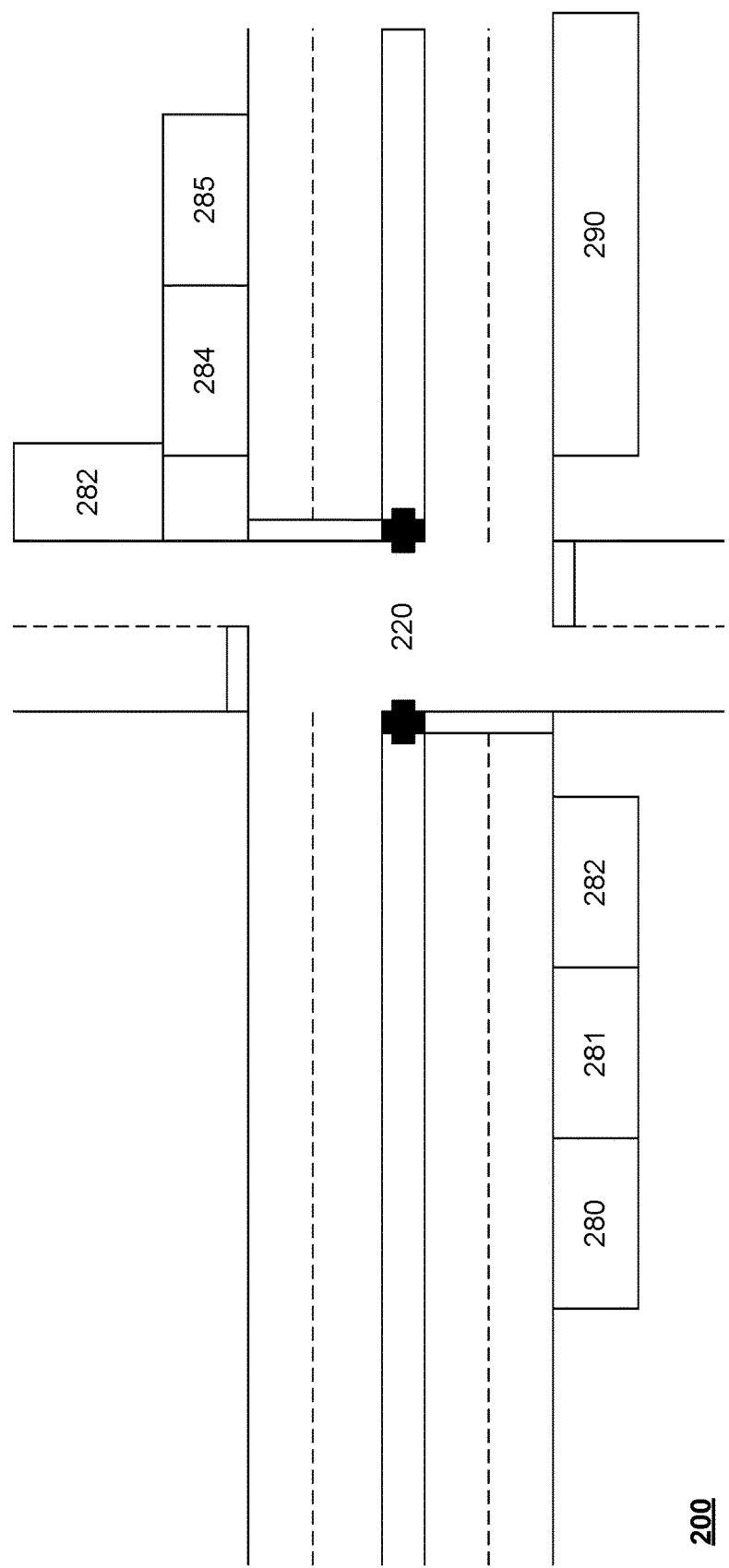

FIGS. 2A and 2B are an example of map information 200 for a section of roadway including intersection 220. FIG. 2A depicts a portion of the map information that includes information identifying the shape, location, and other characteristics of lane markers or lane lines 210, 212, 214, median areas 230, 232, traffic signals 240, 242, as well as stop lines 250, 252, 254, 256. The lane lines may also define various lanes 260-271 or these lanes may also be explicitly identified in the map information 200. In addition to these features, the map information may also include information that identifies the direction of traffic and speed limits for each lane as well as information that allows the computing devices 110 to determine whether the vehicle has the right of way to complete a particular maneuver (i.e. complete a turn or cross a lane of traffic or intersection), as well as other features such as curbs, buildings, waterways, vegetation, signs, etc.

The map information 200 may identify pullover locations which may include areas where a vehicle is able to stop and to pick up or drop off passengers or cargo. These areas may correspond to parking spaces, waiting areas, shoulders, parking lots, etc. For instance, FIG. 2B depicts parking areas 280-286. For simplicity, these pullover locations may correspond to parking spaces, but may correspond to any type of area in which a vehicle is able to stop to pick up and drop off passengers or cargo such as a street sweeping area 290 which is not specifically designated for parking. For instance, the predetermined pullover locations may be determined using heuristics, such as every 1 meter or more or less and may be updated periodically, for instance every week or more or less, based on locations where vehicles of the fleet or other vehicles are observed being stopped or pulled over.

Each of these pullover locations (e.g. depicts parking areas 280-286 and street sweeping area 290) may be associated with particular time limits either directly in the map information or indirectly by being flagged as a particular type that is associated with a particular time limit. These time limits may correspond to an acceptable amount of time for a vehicle to be stopped in the pullover location. These time limits may thus correspond to lawful and/or socially acceptable amounts of time for stopping in given locations. As an example, for a designated parking spot, the time limit may correspond to the rules for that parking spot, such as no parking between 2 am and 6 am, 1 or 2 hour parking, 15 minute parking, etc. In this regard, the time limit for parking space 281 may be greater than the time limit for the street sweeping area 290.

In addition to the aforementioned physical feature and other information, the map information may be configured as a roadgraph which includes a plurality of graph nodes and edges representing road or lane segments that together make up the road network of the map information. Each edge is defined by a starting graph node having a specific geographic location (e.g. latitude, longitude, altitude, etc.), an ending graph node having a specific geographic location (e.g. latitude, longitude, altitude, etc.), and a direction. This direction may refer to a direction the vehicle 100 must be moving in in order to follow the edge (i.e. a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same lane or changing lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable.

The routing system 166 may use the aforementioned map information to determine a route from a current location (e.g. a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

The map information used for routing may be the same or a different map as that used for planning trajectories. For example, the map information used for planning routes not only requires information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g. because it is faster) and therefore be preferable.

Positioning system 170 may be used by computing devices 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it which can often be determined with less noise that absolute geographical location.

The positioning system 172 may also include other devices in communication with the computing devices computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 174 also includes one or more components for detecting objects external to the vehicle such as other vehicles, obstacles in the roadway, traffic signals, signs, trees, etc. For example, the perception system 174 may include LIDARs, sonar, radar, cameras and/or any other detection devices that record data which may be processed by the computing devices of the computing devices 110. In the case where the vehicle is a passenger vehicle such as a minivan, the minivan may include a laser or other sensors mounted on the roof or other convenient location.

Figure 3:
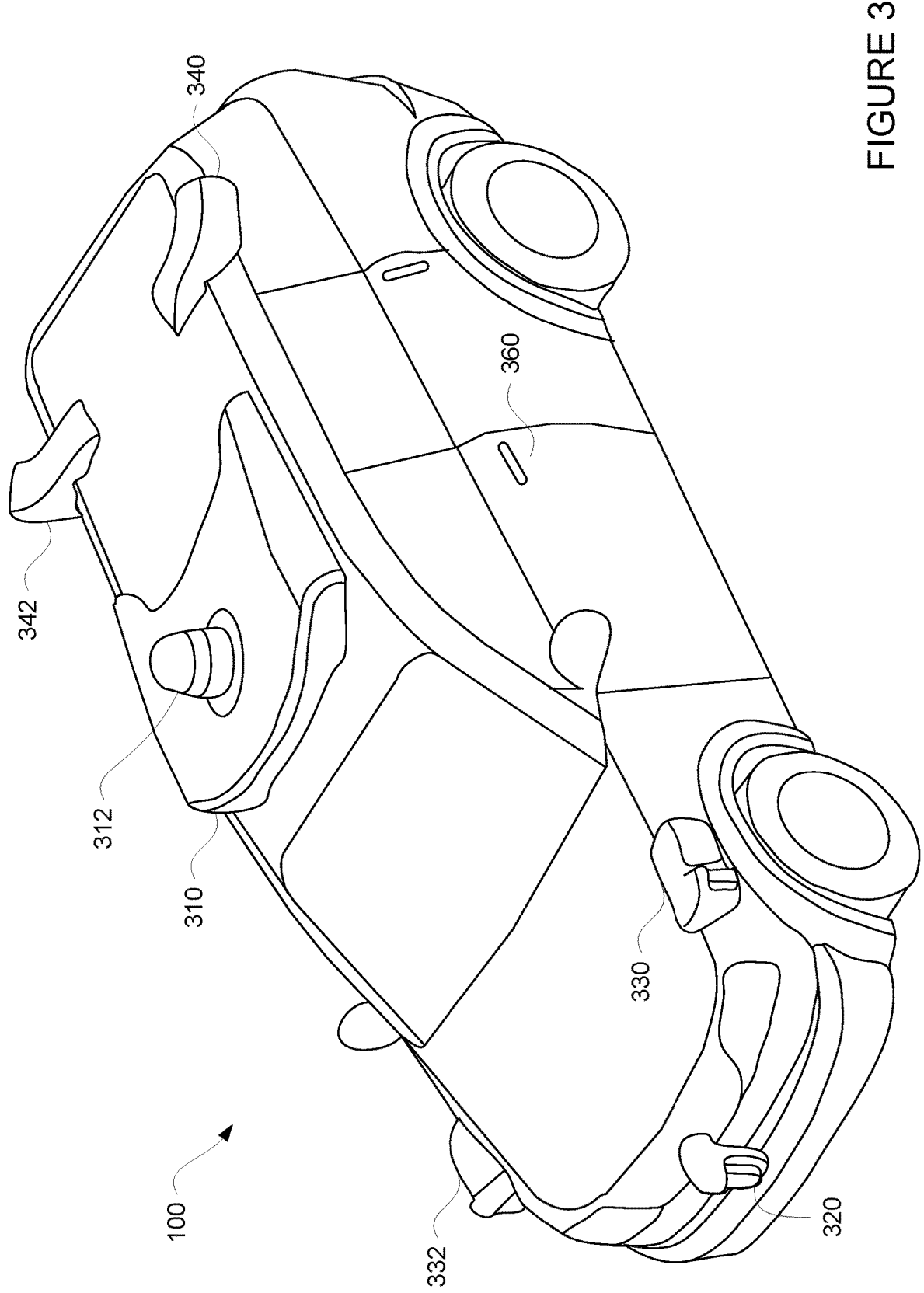
FIG. 3 is an example external view of a vehicle in accordance with aspects of the disclosure.

For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The computing devices 110 may be capable of communicating with various components of the vehicle in order to control the movement of vehicle 100 according to primary vehicle control code of memory of the computing devices 110. For example, returning to FIG. 1, the computing devices 110 may include various computing devices in communication with various systems of vehicle 100, such as deceleration system 160, acceleration system 162, steering system 164, signaling system 166, planning system 168, routing system 170, positioning system 172, perception system 174, behavior modeling system 176, and power system 178 (i.e. the vehicle's engine or motor) in order to control the movement, speed, etc. of vehicle 100 in accordance with the instructions 134 of memory 130.

The various systems of the vehicle may function using autonomous vehicle control software in order to determine how to and to control the vehicle. As an example, a perception system software module of the perception system 174 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module of the behavior modeling system 176 which uses various behavior models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle. Detected objects, predicted future behaviors, various likelihoods from detection system software modules, the map information identifying the vehicle's environment, position information from the positioning system 170 identifying the location and orientation of the vehicle, a destination location or node for the vehicle as well as feedback from various other systems of the vehicle may be input into a planning system software module of the planning system 168. The planning system 168 may use this input to generate trajectories for the vehicle to follow for some brief period of time into the future based on a route generated by a routing module of the routing system 170. In this regard, the trajectories may define the specific characteristics of acceleration, deceleration, speed, etc. to allow the vehicle to follow the route towards reaching a destination. A control system software module of the computing devices 110 may be configured to control movement of the vehicle, for instance by controlling braking, acceleration and steering of the vehicle, in order to follow a trajectory.

The computing devices 110 may control the vehicle in an autonomous driving mode by controlling various components. For instance, by way of example, the computing devices 110 may navigate the vehicle to a destination location completely autonomously using data from the detailed map information and planning system 168. The computing devices 110 may use the positioning system 170 to determine the vehicle's location and perception system 174 to detect and respond to objects when needed to reach the location safely. Again, in order to do so, computing device 110 and/or planning system 168 may generate trajectories and cause the vehicle to follow these trajectories, for instance, by causing the vehicle to accelerate (e.g., by supplying fuel or other energy to the engine or power system 178 by acceleration system 162), decelerate (e.g., by decreasing the fuel supplied to the engine or power system 178, changing gears, and/or by applying brakes by deceleration system 160), change direction (e.g., by turning the front or rear wheels of vehicle 100 by steering system 164), and signal such changes (e.g., by lighting turn signals) using the signaling system 166. Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
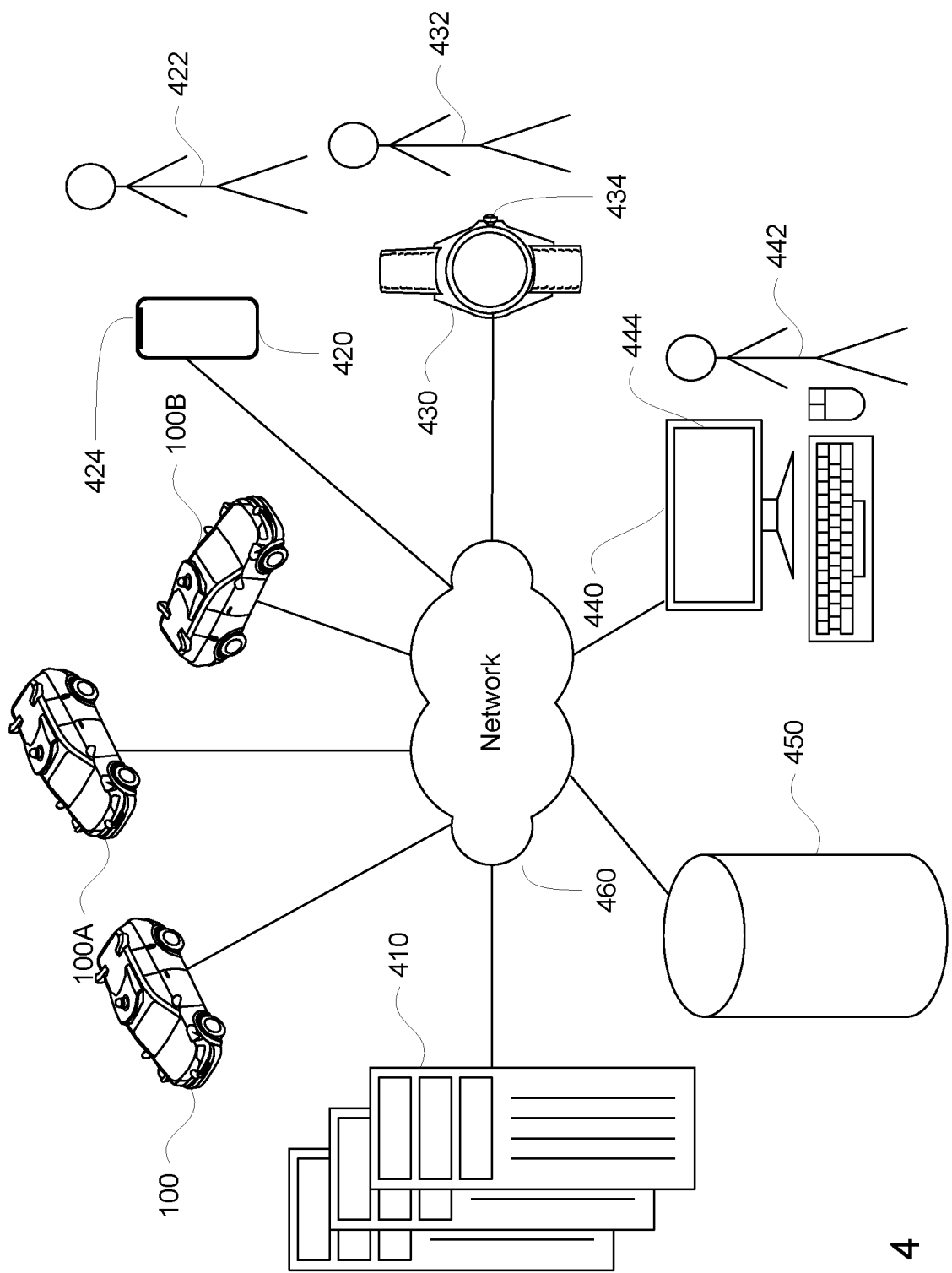
FIG. 4 is a pictorial diagram of an example system in accordance with aspects of the disclosure.
Figure 5:
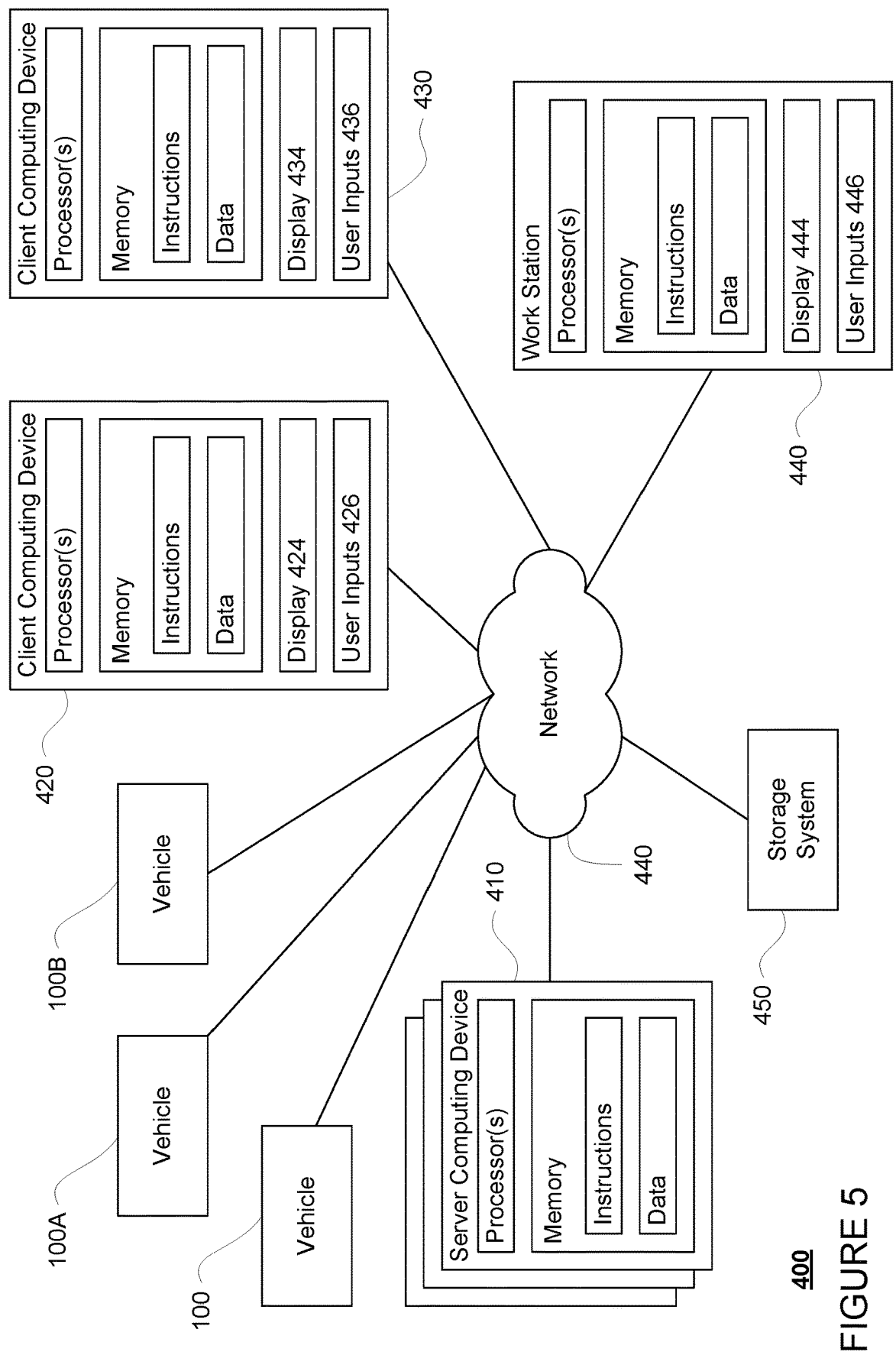
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100A and vehicle 100B, which may be configured the same as or similarly to vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening graph nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A or vehicle 100B as well as computing devices 420, 430, 440 via the network 460. For example, vehicles 100, 100A, 100B, may be a part of a fleet of vehicles that can be dispatched by server computing devices to various locations. In this regard, the server computing devices 410 may function as a fleet management system which can be used to dispatch vehicles such as vehicles 100, 100A, 100B to different locations in order to pick up and drop off passengers. In addition, the computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 3, each client computing device 420, 430 may be a personal computing device intended for use by a user 422, 432 and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 3. As an example the user may input information using a small keyboard, a keypad, microphone, using visual signals with a camera, or a touch screen. As yet another example, client computing device 440 may be a desktop computing system including a keyboard, mouse, camera and other input devices.

Each of the client computing devices may be remote computing device used by a person (e.g. human operators or users 422, 432, 442) to review and analyze sensor data and other information generated by a perception system of a vehicle such as perception system 174 of vehicle 100. For example, user 442 may use the client computing device 440 to review visualizations generated as discussed herein. Although only a few remote computing devices are shown in FIGS. 4 and 5, any number of such work stations may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 3 and 4, and/or may be directly connected to or incorporated into any of the computing devices 110, 410, 420, 430, 440, etc.

Storage system 450 may store various types of information as described in more detail below. This information may be retrieved or otherwise accessed by a server computing device, such as one or more server computing devices 410, in order to perform some or all of the features described herein. For example, the storage system 450 may also store a version of the aforementioned detailed map information (e.g. the map information 200) including all or some of the features discussed above.

Storage system 450 may store various types of information as described in more detail below. This information may be retrieved or otherwise accessed by a server computing device, such as one or more server computing devices 410, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices.

In addition to information that can be used for identification and authentication purposes, the account information may include other information, such as a history of usage of the service. This "trip history" may include the dates, times, pick up locations, drop off locations, and destinations of previous trips using the service. In some examples, the user account information for a user may include "favorite" spots or previously identified user-preferred locations that the user has saved to his or her account identifying preferred pickup or drop off locations for that user. The user account information may also include personal information such as the user's name, contact information, identifying information of the user's client computing device (or devices if multiple devices are used with the same user account), as well as the user's behavior's during trips including how the user may have adjusted internal vehicle state conditions, such as air conditioning, heat, temperature settings, window positions (closed or open and to what extent), etc.

The storage system 450 may also store information about the status of the autonomous vehicles of the fleet. the state of the vehicles using information that is periodically broadcast by the vehicles, specifically requested by the server computing devices 410 (or another system) and provided by the vehicles, or using other methods of tracking the states of a fleet of autonomous vehicles. This periodically broadcast information may include messages providing all state information for a given vehicle including an autonomous vehicle's current location as well as internal vehicle state conditions discussed further below.

The storage system 450 may also store information relating weather conditions with one or more internal vehicle state conditions as well as one or more priorities for pulling over for the initial location. In this regard, the weather conditions, priorities, and internal vehicle state conditions may be associated with one another pre-stored in a table (e.g. a relationship table), database or other storage configuration such that with the determined weather condition, the server computing devices are able to access and identify an associated one or more priorities for stopping at the location as well as one or more internal vehicle state conditions.

The one or more internal vehicle state conditions may include a certain temperature in the vehicle, maximum air conditioning, maximum heat, open windows or windows open to a predetermined extent (e.g. 25% open, 50% open, 75% open, etc.), closed windows, etc. For example, in hot temperatures (e.g. as 80 degree or more or less), an internal vehicle state condition may be turning on maximum air conditioning. As another example, in rainy conditions, an internal vehicle state condition may be closed windows. As another example, in cold temperatures (e.g. as 40 degree or less), an internal vehicle state condition may be maximum heat. Additional internal state conditions may include changes to volume of music or other media, internal lighting, etc.

The one or more priorities may identify what features or factors the server computing devices should look for or rely upon when serving for a pullover location. For example, in hot temperatures (e.g. 80 degree or more or less), the one or more priorities may prioritize being close to the user. As another example, in rainy conditions, the one or more priorities may prioritize being closer to the user and stopped in a location where the vehicle is able to wait longer (e.g. an actual parking spot may have a longer time limit than a shoulder near a loading zone or a street sweeping area). As another example, in rainy conditions, the one or more priorities may prioritize being closer to the user and relaxing constraints related to inconveniencing other road users (e.g. an autonomous vehicle may be more likely to double-park). As another example, in rainy conditions, the one or more priorities may prioritize avoiding congested areas. As another example, in cold temperatures (e.g. 40 degrees or less), the one or more priorities may prioritize being close to the user.

The server computing devices may also access weather information including current weather conditions. In some examples, current weather conditions can be determined using onboard vehicle sensors of an autonomous vehicle and sharing this information with other vehicles (e.g. from vehicle 100 to vehicle 100A and vice versa) and the server computing devices 410. For example, the operation and speed of windshield wipers, triggering of god lights, temperature sensors, wind speed gauges or determinations from data from other sensors, wheel slippage detection, as well as LIDAR, radar, camera and other sensors can all be used to detect current weather conditions (e.g. precipitation, sun glare, etc.). In addition or alternatively, current and predicted weather conditions may be retrieved from third party weather sources which can provide information such as rates of precipitation, sun glare angles, slippery road conditions, fog, haboobs, temperatures, puddle conditions, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 6:
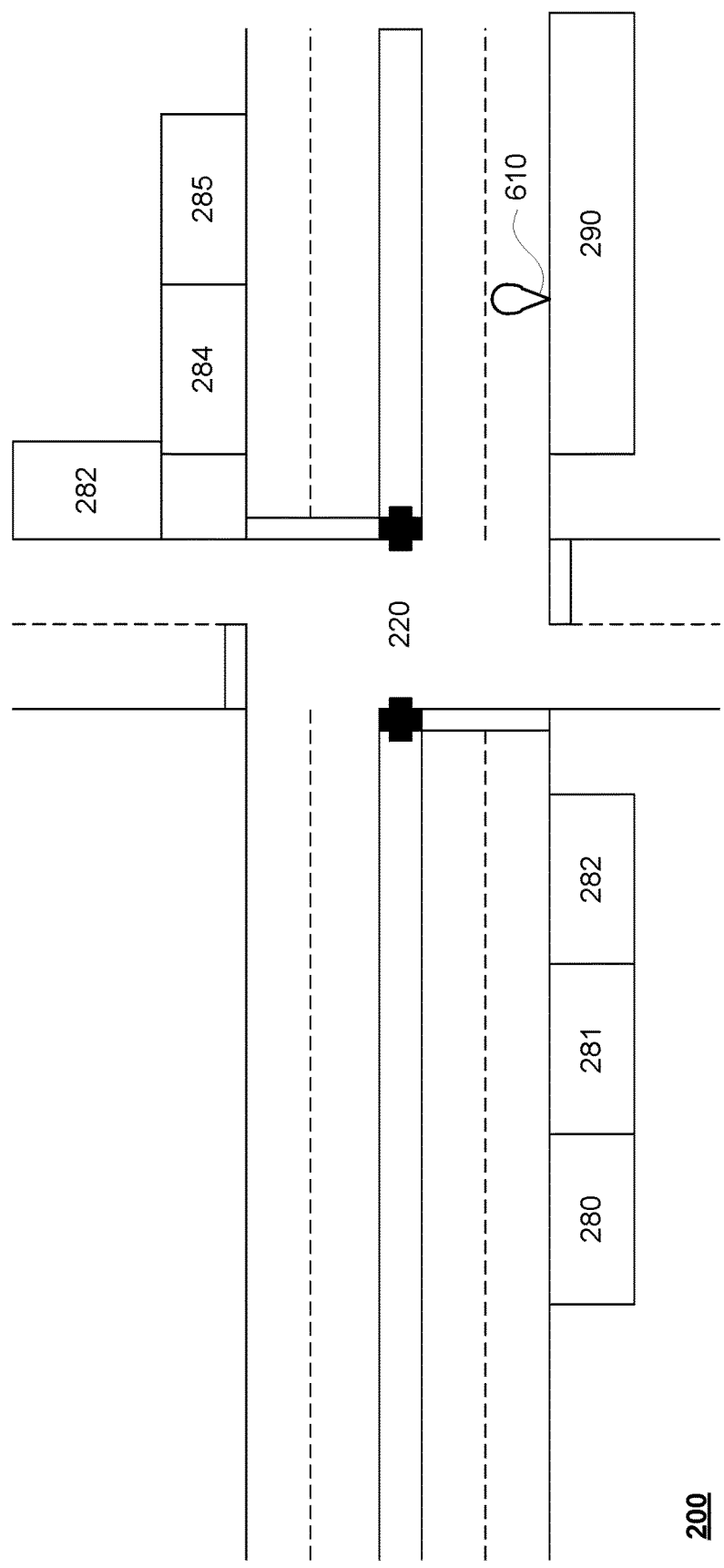
FIG. 6 is an example of map information and an initial location in accordance with aspects of the disclosure.
Figure 11:
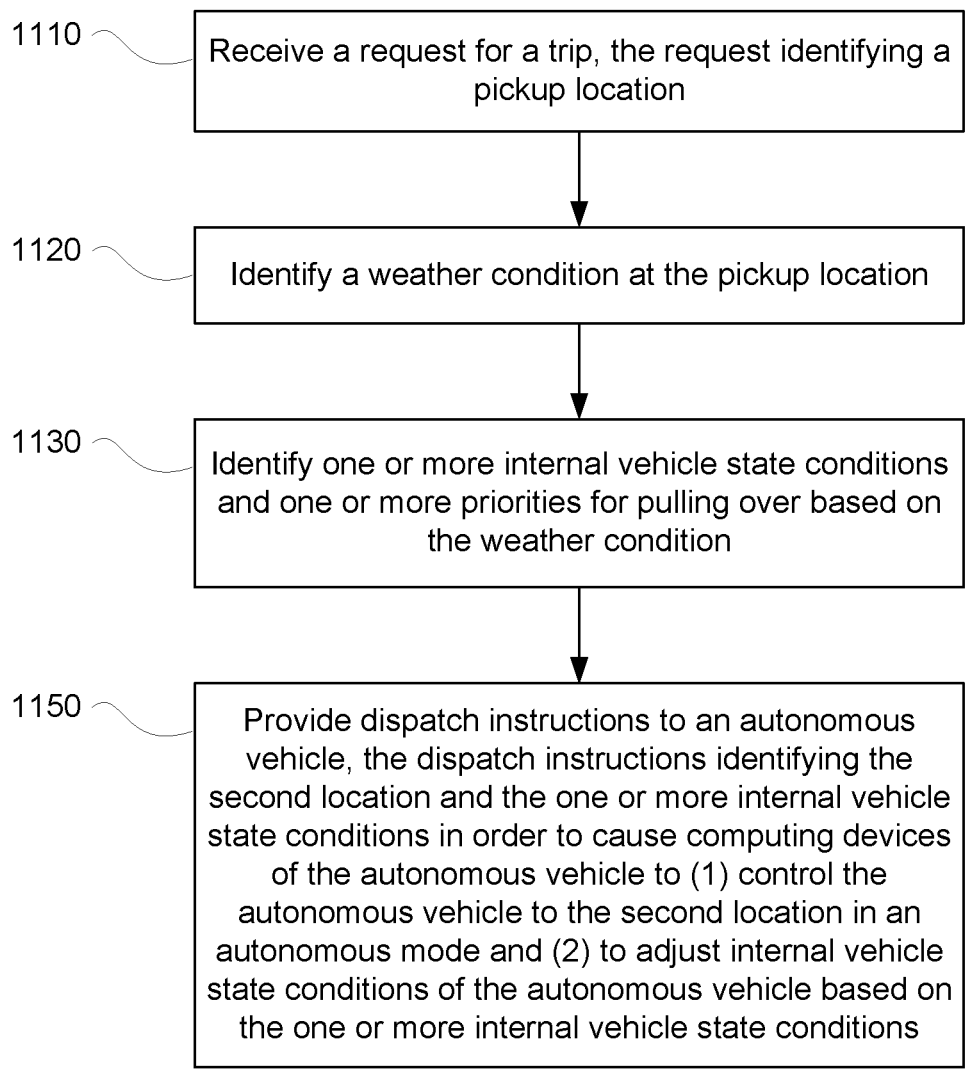
FIG. 11 is an example flow diagram in accordance with aspects of the disclosure.

FIG. 11 is an example flow diagram 1100 for arranging trips for autonomous vehicles, which may be performed by one or more processors of one or more computing devices, such as the processors of the server computing devices 410. At block 1110, a request for a trip is received. This request identifies a pickup location. In order to create a request for a trip, a user of the transportation service, such as user 422, may download an application for requesting a vehicle to a client computing device, such as client computing device 420. For instance, the user 422 may input a pickup location (or this may be automatically determined using a location of the client computing device) as well as a destination (e.g. a drop off location) location for a trip into the client computing device 420. In response, the application may send a signal identifying a pickup and/or a drop off location, referred to hereafter as an "initial" location, to the one or more server computing devices. FIG. 6 is an example of the map information 200 depicting an initial location 610 (represented by a marker).

Figure 7:
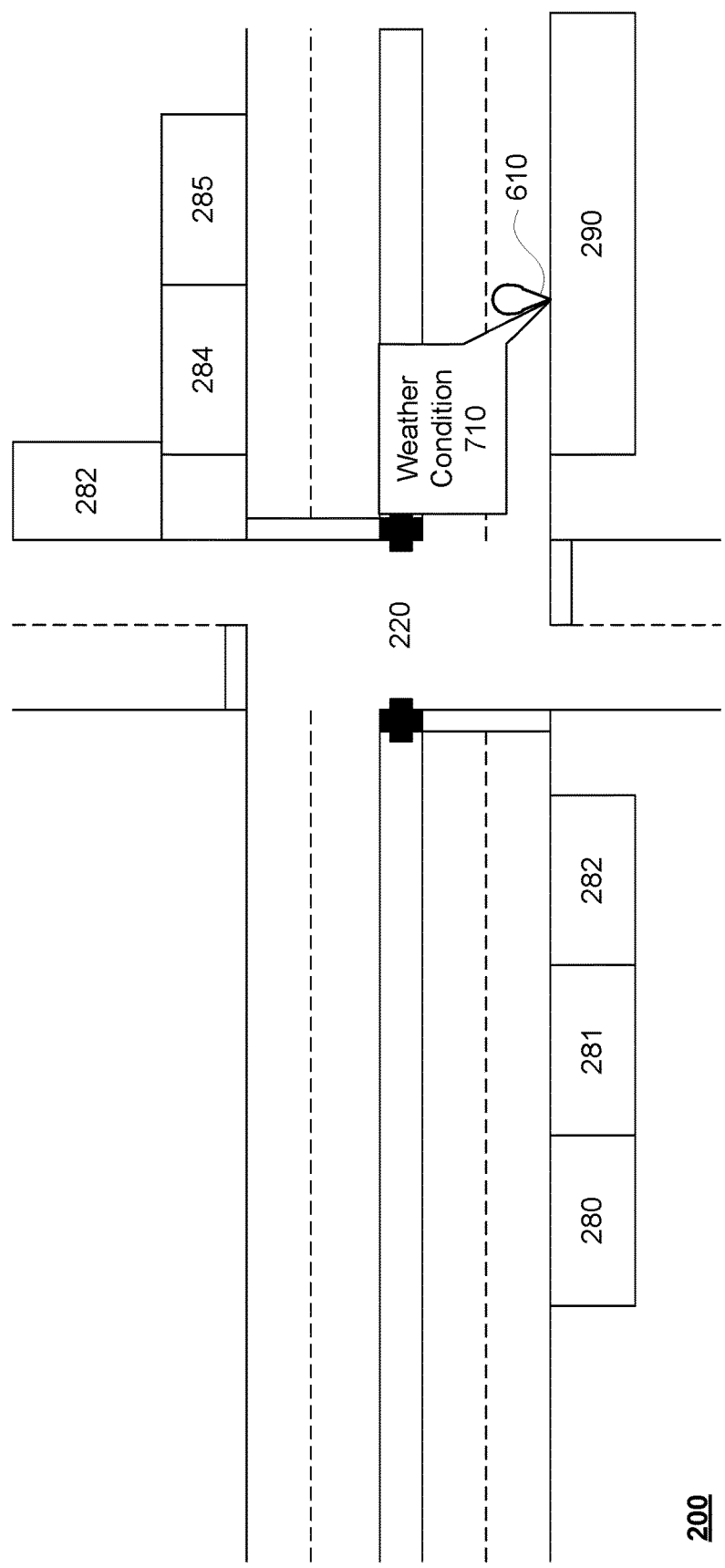
FIG. 7 is an example of map information and a weather condition for an initial location in accordance with aspects of the disclosure.

Returning to FIG. 11, at block 1120 a weather condition at the pickup location is identified. In response to receiving a location for a trip, the one or more server computing devices may determine a weather condition at the initial location. In order to do so, the server computing device may be able to access information about current or predicted weather conditions from the storage system 450. As noted above, in addition or alternatively, current and predicted weather conditions may be retrieved from third party weather sources which can provide information such as rates of precipitation, temperatures, etc. In this regard, a weather condition at the pickup location could be a current weather condition or a future expected weather condition when an autonomous vehicle would be expected to arrive at the pickup location. For instance, an estimated time of arrival can be determined by predicting how long it would take one or more of the closest available autonomous vehicles to reach the pickup location from that autonomous vehicle's current location and selecting the earliest or fastest estimated time of arrival given route options, traffic conditions, etc. FIG. 7 is an example of the map information 200 depicting the initial location 610 as well as a weather condition 710 at the initial location. In this example, weather condition 710 may represent the current or expected weather at the initial location (or rather, for a larger geographic area including the initial location) when an autonomous vehicle is expected to arrive at that location, for example, to pick up a user such as user 422.

Returning to FIG. 11, at block 1130, one or more internal vehicle state conditions and one or more priorities for pulling over based on the weather condition are identified. Based on the determined weather condition, the server computing devices may identify one or more internal vehicle state conditions as well as one or more priorities for pulling over for the initial location. For instance, the server computing devices may access the information stored in the storage system 450, such as the aforementioned relationship table, and use the determined weather condition to identify one or more priorities for stopping at the location as well as one or more internal vehicle state conditions.

FIG. 8 provides an example of a relationship table 800 which may be stored in the storage system 450. In this example, the example relationship table 800 includes a plurality of weather conditions ("WCs") and associated combinations of internal vehicle state conditions ("VSC") as well as one or more priorities ("P"). In this example, the numbers 1, 2, and 3 represent different VSC and P values. For example, WC1 may represent 80 degree or higher temperatures, and VSC1 and P1 may represent an associated internal vehicle state condition (such as turning on maximum air conditioning) and one or more priorities (such as being close to the user, etc.), respectively. As another example, WC2 may represent rainy conditions, and VSC2 and P2 may represent an associated internal vehicle state condition (such as closed windows) and one or more priorities (such as being close to the user, being closer to the user and stopped in a location where the vehicle is able to wait longer, being closer to the user and relaxing constraints related to inconveniencing other road users, avoiding congested areas, etc.), respectively. As another example, WC3 may represent 40 degree or higher temperatures, and VSC3 and P3 may represent an associated internal vehicle state condition (such as maximum heat) and one or more priorities (such as prioritize being close to the user, etc.), respectively. Although only a few combinations are depicted and described, a relationship table or other storage device may identify any number of weather conditions and associated internal vehicle state conditions and one or more priorities.

Returning to FIG. 11, at block 1140, a second location is determined based on the one or more priorities and the initial location. The one or more priorities may be used to assist the server computing devices in selecting a location (e.g. for pickup or drop off) for the trip. For instance, using the one or more priorities, the server computing devices may select an actual location for the trip using a cost-based analysis. For example, given an initial location, the server computing devices may attempt to identify a location within a predetermined distance of the initial location, such as 50 meters or more or less, by weighing a plurality of factors in order to determine a cost for nearby locations.

These factors may include, for example, proximity to the initial location (e.g. walking distance or duration for the user), likelihood of inconvenience to other road users, estimated time of arrival, location relative to a vehicle's next destination, whether the vehicle needs to make any particular maneuvers such as unprotected turns, whether the vehicle would need to stop against a curved curb, reachability (e.g. within a service area of the transportation service), likelihood of the vehicle being unable to make forward progress (e.g. if a vehicle is not permitted to cross railroad tracks, would a vehicle be stranded because it can only move towards railroad crossing), whether the location is on a hill (e.g. a particular grade which might result in limited visibility), traffic conditions (e.g. avoid high-traffic areas, including vehicular, bicycle, pedestrian and other traffic from real time and/or historical data learned over time), how long the vehicle is able to wait in the location (based upon the time limits which as indicated above may be prestored with the map information or may be determined based on the type of the pullover location), and so on. As an example, a typical weighing of factors may prioritize a shorter ETA over a longer walk.

The one or more priorities may thus be used to adjust, up or down, the weights for the different factors. For example, in order to prioritize being close to the user (e.g. a shorter walking distance or duration) the weight for distance from the initial location or walking distance or duration may be decreased and/or other weights may be increased. Using a simple example where the cost of a location (here, location_cost) is determined using an equation:

location_cost=walking_duration*walking_distance_weight+ other_costs_from_other_weighted_factors Accordingly, the cost of a location may be determined by taking a weighted sum of a plurality of factors including walking duration (here, walking_duration) and any other costs determined from other factors (here, other_costs_from_other_weighted_factors). As noted above, these other factors may include, for example, likelihood of inconvenience to other road users, estimated time of arrival, location relative to a vehicle's next destination, whether the vehicle needs to make any particular maneuvers such as unprotected turns, whether the vehicle would need to stop against a curved curb, reachability, likelihood of the vehicle being unable to make forward progress, whether the location is on a hill, traffic conditions, including vehicular, bicycle, pedestrian and other traffic from real time and/or historical data learned over time), how long the vehicle is able to wait in the location, and so on. In this regard, for certain weather conditions, the weight for a location's walking distance (here, walking_distance_weight) may be increased from a default (e.g. relatively lower value) value to a higher (e.g. relatively higher value) while other weights and costs remain constant thereby increasing the cost of that location.

As another example, in order to prioritize being in a location where the vehicle can wait longer (e.g. longer time limit), the weight for this factor may be decreased and/or other weights may be increased. As another example, in order to relaxing constraints related to inconveniencing other road users (e.g. those related to double parking, other behaviors or inconvenience more generally), the weight for this factor may be decreased and/or other weights may be increased.

Figure 9:
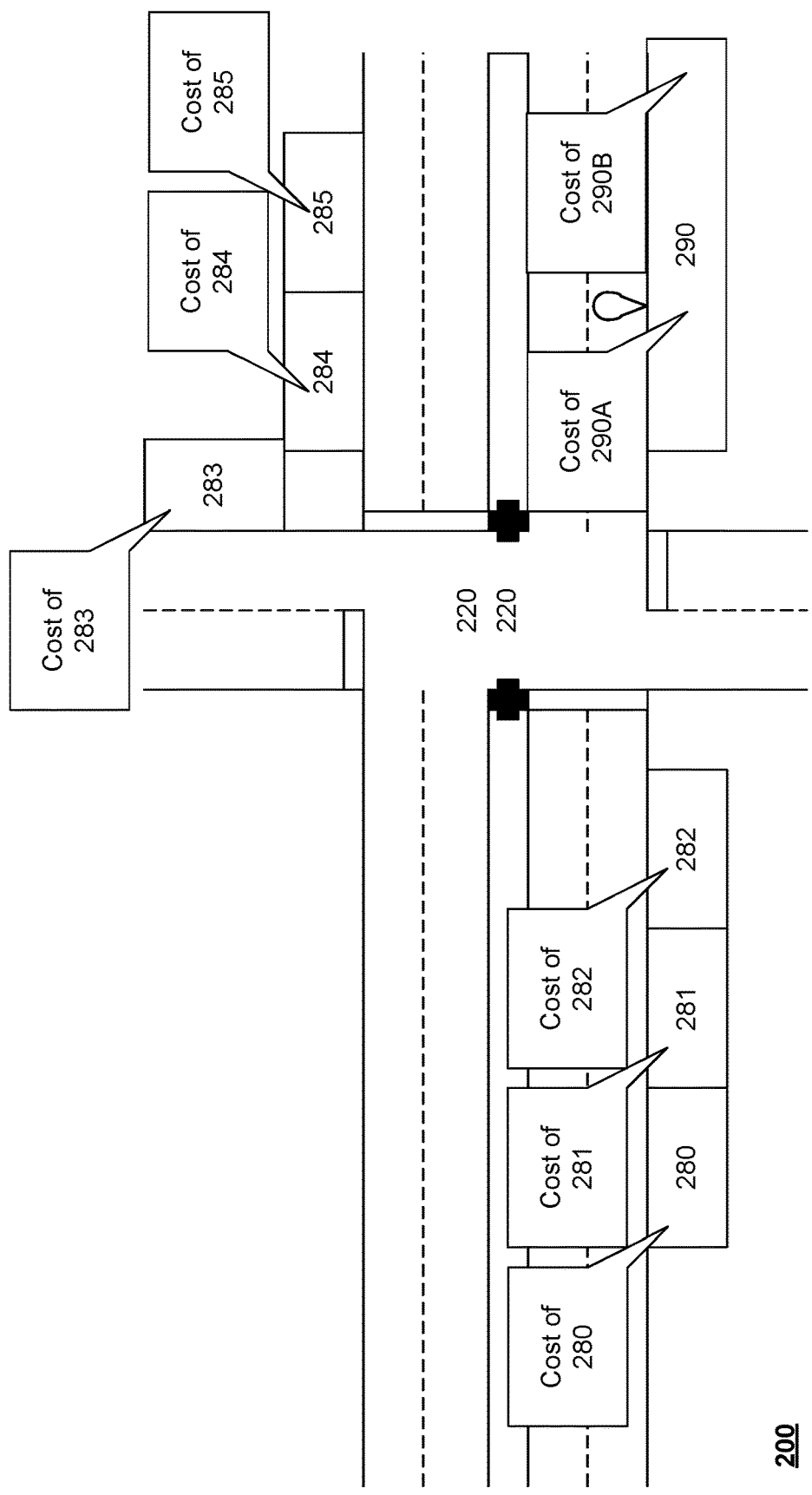
FIG. 9 is an example of map information and costs for pullover locations in accordance with aspects of the disclosure.

Turning to FIG. 9, the server computing devices 410 may identify parking areas 280-286 as well as one or more potential pullover locations within the street sweeping area 290 as being within the predetermined distance of the initial location 610. As indicated above, these pullover locations may correspond to potential stopping locations located every 1 meter or more or less within the street sweeping area 290, in this regard, the server computing devices 410 may consider a street sweeping area 290 to include a plurality of potential pullover locations (e.g. "290A" and "290B"). The server computing devices 410 may then determine a cost for each of these pullover locations based on the one or more priorities associated with the identified weather condition in the relationship table 800. For example, if the weather condition 710 corresponds to 80 degree temperatures, locations, such as parking spaces 290A and 290B which are closer to the initial location 610 may have lower costs than locations such as parking areas 282, 285 which are farther from the initial location 610. As another example, if the weather condition 710 corresponds to rainy conditions, locations, such as parking spaces 282 and 283 which are father from the initial location 610 but where the vehicle is able to wait longer (e.g. longer time limit) for the user 422 may have lower costs than locations such as parking spaces 290A and 290B which are closer to the initial location 610 but where the vehicle is not able to wait as long (e.g. shorter time limit).

The location with the lowest cost may then be identified as an actual or suggested location for the trip. In other words, the server computing devices 410 may set the location automatically (actual location) or may provide the location as a suggestion and allow some further adjustments by the user. In some cases, the initial location and the actual or suggested location may be the same location, and in other cases, the initial location and the actual or suggested location may be different.

Figure 10:
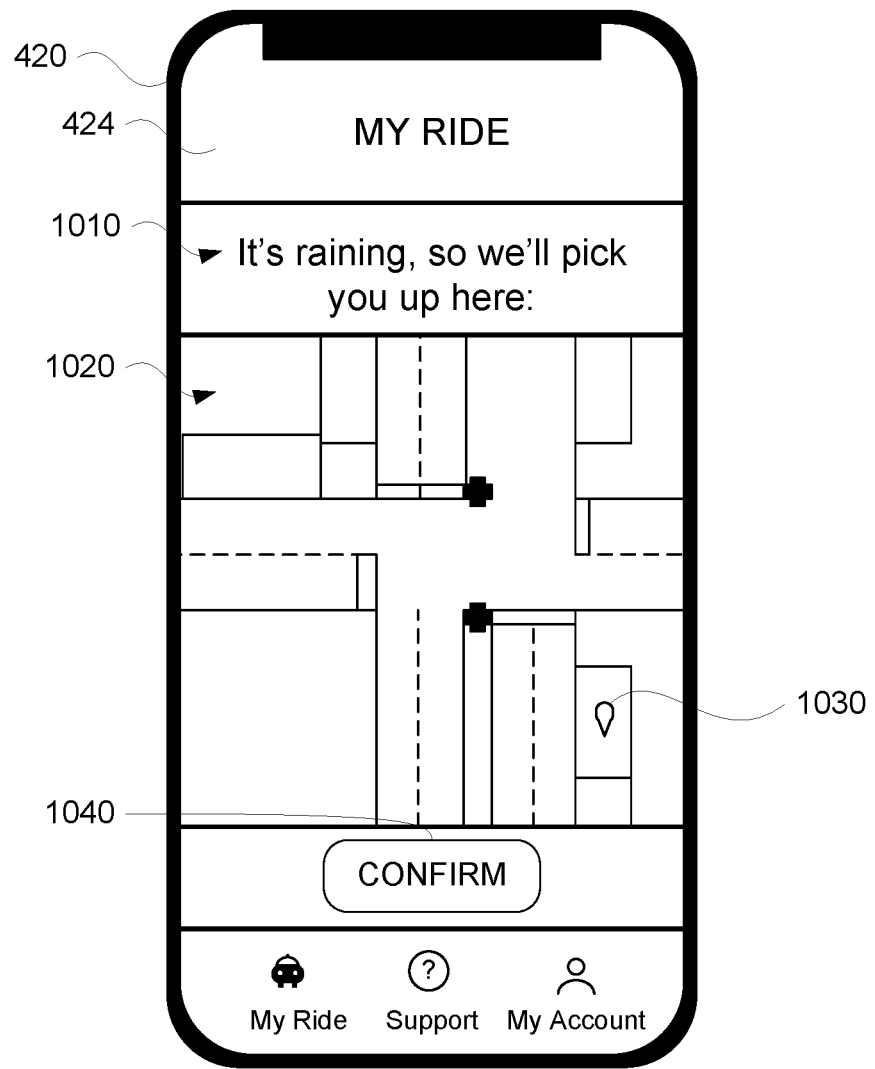
FIG. 10 is an example of a client computing device and displayed information in accordance with aspects of the disclosure.

In instances where the identified location is provided as a suggestion, the identified location may be sent to the user's client computing device to be displayed to the user. For instance, the server computing devices 410 may send a signal via network 460 to the client computing device 420 to cause the application to display the identified location. FIG. 10 is an example of client computing device 420 providing a notification 1010 indicating that due to a weather condition (here rainy conditions) as well as a map 1020 corresponding to features of the map information 200 identifying a location 1030 as a suggested or actual location for a pickup for the user 422. Once the user 422 is satisfied with the identified (or adjusted if another location is preferred by the user) locations for each of the pickup and drop off locations, he or she may confirm the details of the trip, such as by selecting the "confirm" button or option 1040. This may send a confirmation signal (e.g. confirming that the user 422 has accepted the pickup and/or drop off location) to the server computing devices 410, for instance, via the network 460.

Returning to FIG. 11, at block 1150, dispatch instructions are provided to an autonomous vehicle. The dispatch instructions identify the second location and the one or more internal vehicle state conditions in order to cause computing devices of the autonomous vehicle to (1) control the autonomous vehicle to the second location in an autonomous mode and (2) to adjust internal vehicle state conditions of the autonomous vehicle based on the one or more internal vehicle state conditions. In response to receiving the identified location, the server computing devices may select a vehicle and send dispatch instructions to that autonomous vehicle. The autonomous vehicle may be selected based on proximity to the pickup location for the trip, availability of vehicles, and other factors. For instance, the server computing devices 410 may select vehicle 100 and may send the dispatch instructions to the vehicle 100.

The dispatch instructions may identify a pickup location, a destination location for the trip, and the one or more internal vehicle state conditions. Initially, once the selected autonomous vehicle, here vehicle 100, is ready to pick up the user, the computing devices 110) may set the pickup location as a destination for the trip in order to control the vehicle 100 to that destination in the autonomous driving mode. At the same time or at some point before reaching the pickup location the computing devices 110 may adjust the vehicle 100's internal state based upon the internal vehicle state condition. This may involve turning on, increasing or decreasing heat or air conditioning in the vehicle, opening windows, closing windows, etc. in order to achieve the internal vehicle state condition. Once stopped, the computing devices 110 may set the drop off location as a destination for the vehicle 100 in order to control the vehicle to that destination in the autonomous driving mode.

As users utilize the transportation service more and more, additional information about the users' behaviors once they enter the selected autonomous vehicle may be used to adjust the internal vehicle state conditions for different weather conditions. For instance, once a user enters an autonomous vehicle, he or she ay adjust the heat or air conditioning in the vehicle. This information combined with weather condition data may be used to adjust the internal vehicle state condition for different weather conditions. Moreover, this may enable the transportation service to customize these associations for different geographic areas. For instance, information may be used to determine and store associations for different geographic locations. As such, the server computing devices may store and access associations for different geographic regions, service areas, etc. In other words, the information stored in the storage system 450, such as the internal vehicle state conditions of the aforementioned relationship table associated with certain weather conditions, may be updated with new information for different geographic areas. The updated internal vehicle state conditions may then be provided to autonomous vehicles depending upon the geographic area in which the initial location is located. As an example, raining and 70 degrees in Phoenix Arizona may result in a user increasing the temperature (e.g. turning on the heat) in the vehicle, whereas raining and 70 degrees in San Francisco California may result in a user decreasing the heat (e.g. turning off the heat or turning on the air conditioning) in the vehicle.

Although the examples described herein relate to setting up a new trip, similar features may also be utilized to adjust a drop off location before the user has been picked up as well as during a trip. This may occur, for instance, in response to the server computing devices 410 identifying an updated or new weather condition at the pickup or drop off location. As such, the server computing devices may determine whether the vehicle's current destination (e.g. a pickup or drop off location) should be adjusted using the one or more priorities as described above. In this case, a threshold may be used to determine whether there is enough of a difference between the locations to make the change "worthwhile" and to avoid constantly changing destinations. If so, the server computing devices 410 may send updated dispatch instructions to the selected autonomous vehicle with a new destination. In such instances, a notification may be displayed to the user at the user's client computing device. If the user is already in the selected autonomous vehicle (e.g. on the way to a drop off location), the notification may also be displayed in the selected autonomous vehicle, such as on internal electronic display 152. In this regard, the user may be provided with information.

Again, although the examples above relate to a pick up location, for a drop off location, in addition to identifying one or more priorities and a new (or adjusted) destination, the weather condition at the drop off location may also be used to identify an internal vehicle state condition. For example, the associated internal vehicle state condition may identify (again from the relationship table described above or another relationship table) how the vehicle should adjust the internal temperature of the vehicle so that the internal temperature is as close as possible to the temperature conditions at the drop off location. In this regard, when the passenger exits the vehicle, the temperature difference between the inside of the vehicle and the external environment can be minimized. In this way, if the weather outside is cold, the vehicle may automatically lower the heat so the passenger experiences less of a contrast (e.g. can put on a jacket and be more comfortable).

As users utilize the server more and more, additional information about their behaviors once they enter the vehicle may be used to adjust the internal vehicle state conditions for different weather conditions. For instance, once a user enters a vehicle, he or she may adjust the heat or air conditioning in the vehicle. This information combined with weather condition data may be used to adjust the internal vehicle state condition for different weather conditions. Moreover, this may enable the transportation service to customize these associations for different geographic areas. As an example, raining and 70 degrees in Phoenix Arizona may result in a user increasing the temperature (e.g. turning on the heat) in the vehicle, whereas raining and 70 degrees in San Francisco California may result in a user decreasing the heat (e.g. turning off the heat or turning on the air conditioning) in the vehicle. This information may be used to determine and store associations for different geographic locations. As such, the server computing devices may store (for instance in the storage system 450) and access associations for different geographic regions, service areas, etc.

The features described herein may provide an improved user experience for transportation services provided by autonomous vehicles. For instance, by leveraging certain weather information, this can be used to choose better pickup or drop off locations and also provide a user with an expectation of what is going to happen during a trip. Similarly, doing so at the server computing devices when the user is setting up the trip may also provide a user with an expectation of what is going to happen during a trip. In addition, by updating an internal state of the vehicle, the user may actually feel more comfortable and relaxed during a trip.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
   receiving, by one or more processors of one or more server computing devices, a request for an autonomous vehicle for a trip for a passenger, the request including a requested pickup location for the trip;

identifying, by the one or more processors, a weather condition at the requested pickup location;

identifying, by the one or more processors based on the identified weather condition, one or more internal vehicle state conditions associated with the identified weather condition, the identified one or more internal vehicle state conditions being stored in memory accessible by the one or more server computing devices;

identifying, by the one or more processors based on the identified weather condition, one or more priorities associated with the identified weather condition, the identified one or more priorities being stored in the memory;

determining, by the one or more processors, a pickup location based on the identified one or more priorities, the identified weather condition, and the requested pickup location, wherein the identified one or more priorities include prioritizing proximity of the determined pickup location to the passenger by relaxing constraints related to inconveniencing other road users; and providing, by the one or more processors, first dispatch instructions to computing devices of the autonomous vehicle, to:
control the autonomous vehicle to arrive at the determined pickup location; and
adjust internal state of the autonomous vehicle based on the identified one or more internal vehicle state conditions.

2. The method of claim 1, wherein identifying the one or more internal vehicle state conditions associated with the identified weather condition and identifying the one or more priorities includes looking up the identified weather condition in the memory.

3. The method of claim 1, wherein the identified one or more internal vehicle state conditions indicate one or more windows of the autonomous vehicle to be in an opened state, and
wherein the adjustment of the internal state of the autonomous vehicle includes adjustment of the one or more windows of the autonomous vehicle so that the one or more windows of the autonomous vehicle are in the opened state.

4. The method of claim 1, wherein the identified one or more internal vehicle state conditions indicate one or more windows of the autonomous vehicle to be in a closed state, and
wherein the adjustment of the internal state of the autonomous vehicle includes adjustment of the one or more windows of the autonomous vehicle so that the one or more windows of the autonomous vehicle are in the closed state.

5. The method of claim 1, wherein the identified one or more internal vehicle state conditions indicate air conditioning of the autonomous vehicle to be operating in a maximum air conditioning setting, and
wherein the adjustment of the internal state of the autonomous vehicle includes adjustment of the air conditioning of the autonomous vehicle so that the air conditioning of the autonomous vehicle operates in the maximum air conditioning setting.

6. The method of claim 1, wherein the identified one or more internal vehicle state conditions indicate heating of the autonomous vehicle to be operating in a maximum heat setting, and
wherein the adjustment of the internal state of the autonomous vehicle includes adjustment of the heating of the autonomous vehicle so that the heating of the autonomous vehicle operates in the maximum heat setting.

7. The method of claim 1, wherein the identified one or more internal vehicle state conditions indicate a particular temperature of the autonomous vehicle, and
wherein the adjustment of the internal state of the autonomous vehicle includes adjustment of heating or air conditioning of the autonomous vehicle so that a temperature of the autonomous vehicle is the particular temperature.

8. The method of claim 1, wherein the identified one or more priorities further include prioritizing a longer time limit associated with stopping at the determined pickup location.

9. The method of claim 1, wherein the identified one or more priorities further include avoiding congested areas.

10. The method of claim 1, wherein determining the determined pickup location includes adjusting one or more weights for a plurality of factors associated with selecting one or more pickup locations according to the identified one or more priorities.

11. The method of claim 1, wherein the requested pickup location and the determined pickup location are a same pickup location.

12. The method of claim 1, wherein the requested pickup location and the determined pickup location are different pickup locations.

13. The method of claim 1, further comprising, providing the determined pickup location to a client computing device for display to the passenger.

14. The method of claim 13, further comprising:
in response to providing the determined pickup location to the client computing device, receiving a confirmation signal from the client computing device, the confirmation signal being indicative of confirmation of the determined pickup location by the passenger; and
providing, by the one or more processors in response to receiving the confirmation signal, the first dispatch instructions to the computing devices of the autonomous vehicle to control the autonomous vehicle to arrive at the determined pickup location.

15. The method of claim 1, wherein the request further identifies a requested drop off location for the trip, and the method further comprises:
identifying, by the one or more processors, another weather condition at the first requested drop off location;
identifying, by the one or more processors based on the other weather condition, one or more other priorities associated the other weather condition; and
determining, by the one or more processors, a drop off location based on the identified one or more other priorities and the requested drop off location; and
providing, by the one or more processors, second dispatch instructions to the computing devices to control the autonomous vehicle to arrive at the requested drop off location.

16. The method of claim 15, further comprising:
during the trip to the determined drop off location, identifying, by the one or more processors, an updated weather condition at the determined drop off location;

determining, by the one or more processors, a different drop off location based on the updated weather condition; and providing, by the one or more processors, third dispatch instructions to the computing devices of the autonomous vehicle to control the autonomous vehicle to arrive at the determined different drop off location.

17. The method of claim 1, further comprising:

prior to arrival of the autonomous vehicle at the determined pickup location, identifying, by the one or more processors, an updated weather condition at the determined pickup location;

determining, by the one or more processors, a different pickup location based on the updated weather condition; and providing, by the one or more processors, second dispatch instructions to the computing devices to control the autonomous vehicle to arrive at the different pickup location.

18. The method of claim 1, further comprising:

receiving, by the one or more processors, information indicative of adjustments to the internal state of the autonomous vehicle by one or more passengers of the autonomous vehicle; and updating, by the one or more processors, the identified one or more internal vehicle state conditions based on the received information.

19. The method of claim 1, wherein the adjustment of the internal state of the autonomous vehicle includes adjustment of a state of one or more windows of the autonomous vehicle based on the identified one or more internal vehicle state conditions.

20. The method of claim 1, wherein the identified one or more priorities further include prioritizing the proximity of the determined pickup location to the passenger by relaxing constraints related to double parking.

* * * * *